Patented Jan. 9, 1923.

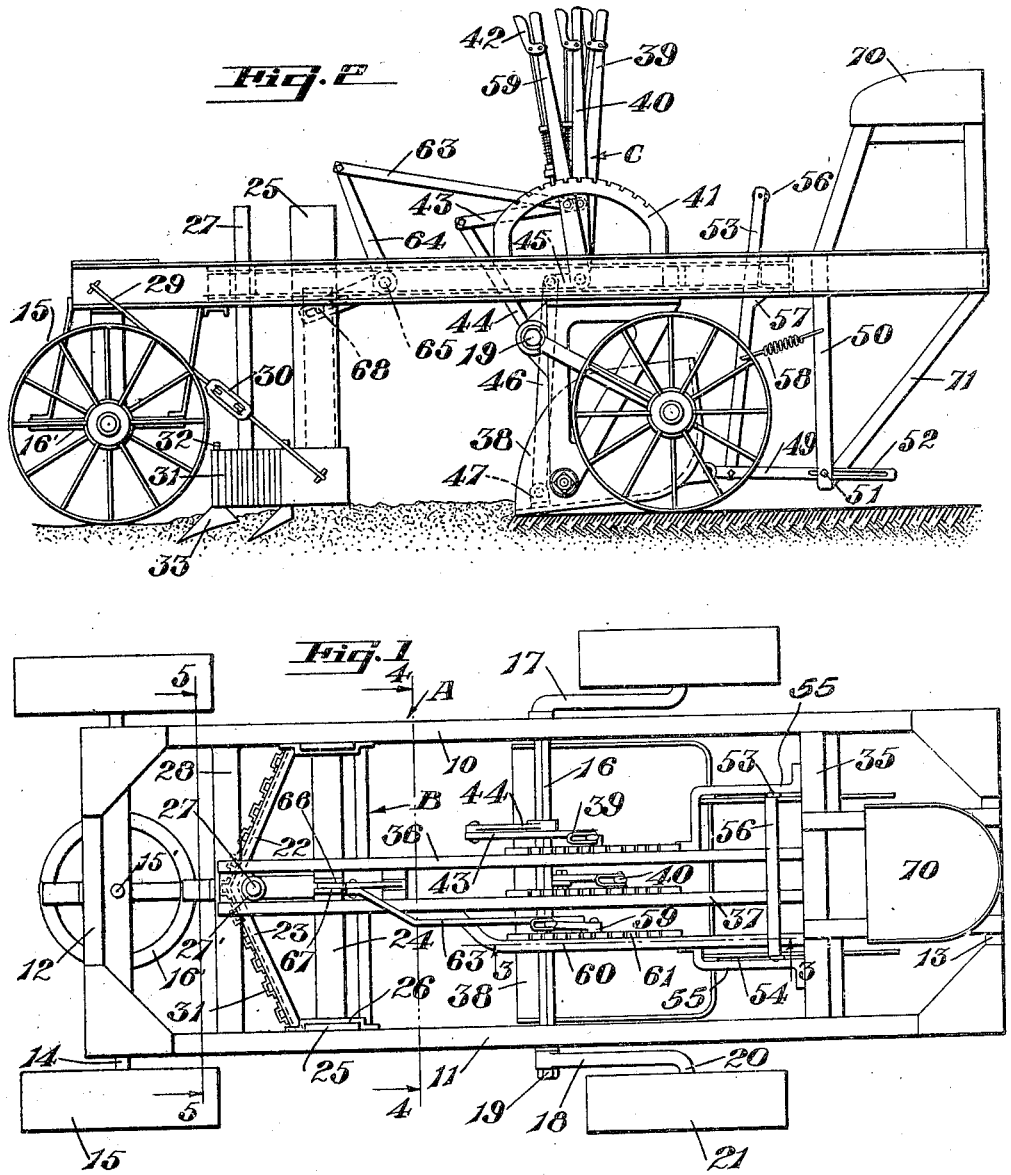

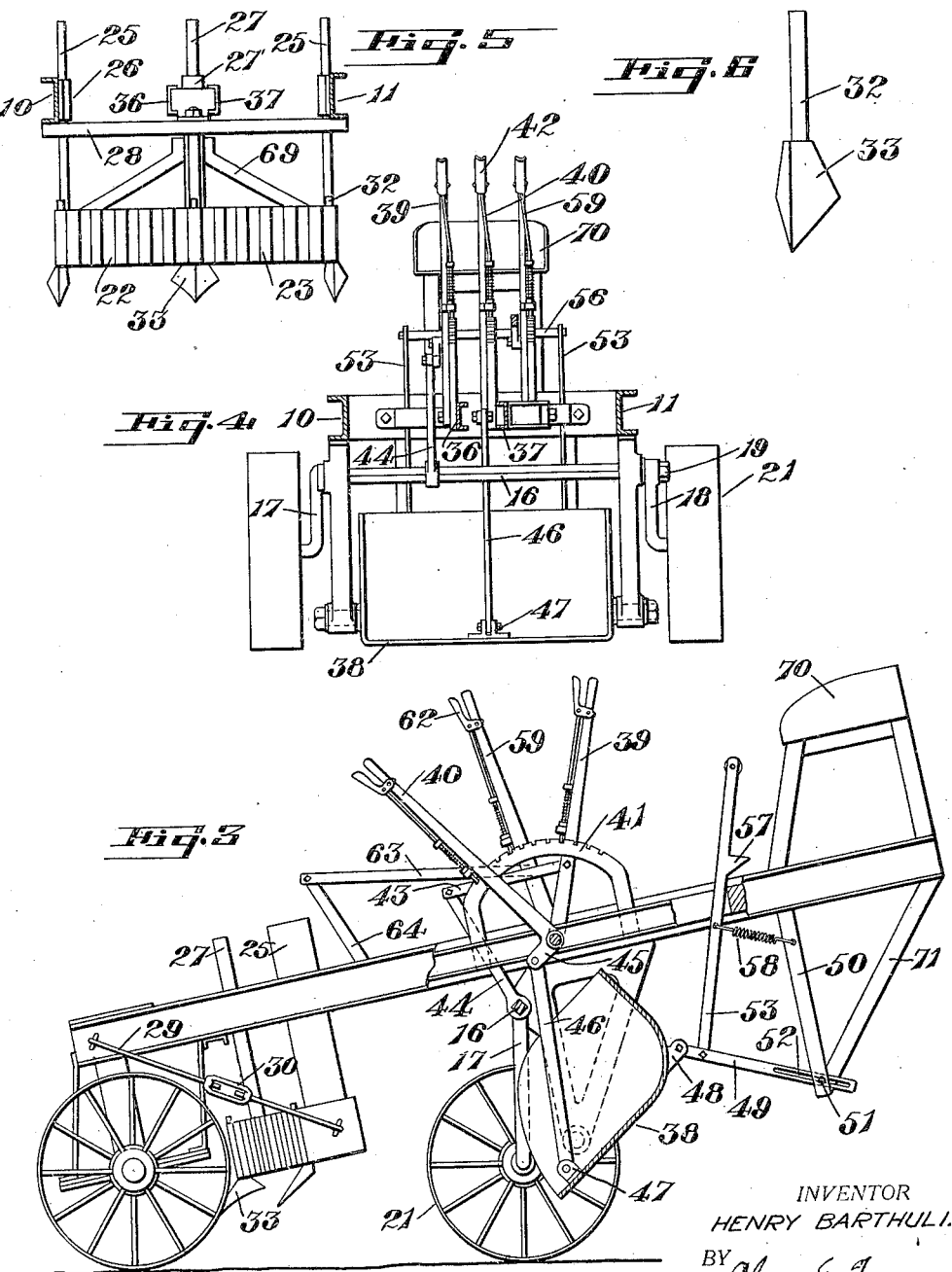

1,441,621

UNITED STATES PATENT OFFICE.

HENRY BARTHULI, OF FRESNO, CALIFORNIA.

LAND LEVELER.

Application filed December 29, 1920. Serial No. 433,858.

*To all whom it may concern:*

Be it known that I, HENRY BARTHULI, a citizen of the United States, residing at Fresno, in the county of Fresno and State of California, have invented new and useful Improvements in Land Levelers, of which the following is a specification.

This invention relates to an earth working implement, and particularly pertains to a land leveler.

It is the principal object of the present invention to provide a land leveling implement which may be used in soil of various hardness, and which may be adjustably operated to break up the soil, and to insure that its contour may be readily altered as desired.

The present invention contemplates the use of an implement having a running gear carrying a combined scraper and shovel, by which the ground may be scraped, and the loose dirt carried off, and in front of which member means are provided to break up the soil for action of the scraper, all of which mechanism is adjustable to regulate the penetration of the soil breaking means and the scraper.

The invention is illustrated by way of example in the accompanying drawings, in which:

Figure 1 is a view in plan showing the completely assembled implement.

Fig. 2 is a view in side elevation showing the implement as assembled, and further discloses the operation of the soil breaking means and the scraper.

Fig. 3 is a view in side elevation with parts broken away to disclose the inoperative position of the implement.

Fig. 4 is a view in transverse section through the implement showing the mounting of the scraper shovel.

Fig. 5 is a view in transverse section through the implement showing the soil breaking element.

Fig. 6 is a view in perspective showing one of the plows used.

Referring to the drawings more particularly, A indicates a rectangular frame comprising the side members 10 and 11 and the front and rear members 12 and 13 respectively. The front end of the frame is supported by an axle 14 and wheels 15, said axle being pivotally connected to the frame by means of a king pin indicated at 15' and a fifth-wheel construction indicated at 16'.

Near the middle portion of the frame A there is journaled a shaft 16, said shaft having an axle crank 17 at one end, and its other end squared to receive the upper end of an axle crank 18 which is adapted to seat thereover. A nut 19 is threaded upon an extension of the squared end of the shaft 16 to detachably hold the crank 18 in position. On the spindle portion 20 of the axle crank 18 and axle crank 17 there are journaled rear wheels 21, thus providing means for raising and lowering the rear end of the frame A, the purpose of which will later become evident.

At a point between the shaft 16 and the front end of the frame A there is mounted a digging or plowing unit generally indicated at B. This unit comprises a plow or digger frame comprising two diverging and vertically disposed members 22 and 23, which are secured together at their forward ends while their outer ends are connected by a cross bar 24. To each end of the cross bar 24 is secured one end of vertically disposed members 25, said members each being slidably held to the inner side of the frame rails by means of a channel strap 26. Extending vertically from the point of union of the plates 22 and 23 is a guide bar 27 which is journaled at its upper end in a sleeve 27' secured to a cross member 28, said cross member being secured between the sides of the frame A. This mounting of the plow units permits free upward and downward movement thereof for adjusting the depth of the plows. A rod 29 is secured between each end of the plow frame and the forward end of the frame A in order to take up the strain imposed upon the plow frame when plowing or digging, and especially when a turn is being made. The rods permit a limited amount of vertical movement of the plow frame and in each rod there is inserted a turn-buckle 30 in order that said permissible vertical movement may be increased or decreased as desired.

Each member 22 and 23 of the plow frame has secured thereto a plurality of channel members 31, each being adapted to slidably receive the shank or stem 32 of a plow or digger 33. These plows have a point and mold board similar in shape to the ordinary plow cotter, as shown in Fig. 6. The middle plow or digger, however, has a mold board on each of its sides, as shown in Fig. 5. The plows may be mounted one in each channel member 31 or a less number of plows may be used, depending upon the hardness of the ground. It has been found in practice that the three diggers, as shown, will suffice when the ground is sandy or relatively loose.

Near the rear end of the frame A there is secured a cross brace 35 and between this brace and cross member 28 there is secured the truss members 36 and 37 which support the scraper or shovel 38, and also as generally indicated at C the operating means for the scraper and the operating means for the plow unit. The operating means for the scraper consists in the two hand levers 39 and 40, the lever 39 being pivotally connected at its one end to the truss 36 while the lever 40 is likewise connected with the truss 37. A ratchet sector 41 is provided for each lever, and a hand grip latch and rod operating mechanism 42. One end of a link 43 is pivotally connected to the hand lever 39 and its other end is pivotally connected to an arm 44, said arm being rigidly secured at its opposite end to the shaft 16. The lever 39 and its connecting links between the shaft 16 are relatively large and designed to withstand considerable stress without injury. They are provided to rotate the shaft 16 in either direction and thus raise or lower the rear end of the frame A. This operation is required in dumping the scraper and will later be more fully described.

The lower end of the hand lever 40 carries a rigid arm 45 which extends substantially at right angles thereto, and is pivotally connected at its outer end to a link 46. The lower end of the link 46 is pivotally connected to a lug 47 which is preferably positioned centrally of the bottom of the scraper and adjacent its forward end, as shown.

The rear end of the scraper is formed with a pair of outwardly projecting lugs 48, one near each side thereof, and to each lug there is pivotally connected the one end of a bar member 49. A pair of spaced rigid arms 50 extend downwardly from the cross brace 35 and are connected at their lower ends by a rod 51. Each bar 49 is provided with an elongated slot 52 through which the rod 51 passes. The members 49 are thus free to move longitudinally with relation to the arms 50. Near the forward end of each bar 49 there is pivotally attached an end of a vertically disposed bar 53, said bars 53 each having their upper end disposed within an elongated guideway 54 formed in the sectional truss members 55. Between the upper ends of the members 53 there is journaled a roller 56. Each bar 53 has formed thereon a tooth-like projection 57 which has its upper edge disposed at right angles to the bar and its lower edge inclined as shown. The bars 53 are further connected with the arms 50 by means of a pair of coil springs 58.

The plow unit may be raised and lowered by a hand device 59 which has its lower end pivotally connected with a sectional truss member 60. Associated therewith is a ratchet sector 61 and hand grip latch and rod mechanism 62 similar to that used with the hand levers 39 and 40. A bar 63 has its one end pivotally connected to one arm of the bell crank lever 64. The bell crank lever 64 is fulcrumed between the truss 36 and 37 by means of a pin or the like, as indicated at 65, and its other arm is pivotally connected between the inner ends of the brace members 66 and 67, as at 68. Each brace member 66 and 67 has its outer end secured to one side of the plow frame and both members are further supported or braced by the member 69 which extends between the inner end of said braces and the point of union of the members 22 and 23 of the plow frame. As is obvious, that by manipulating the hand lever 59 the plows may be raised or lowered and held in their adjusted position. On the rear end of the frame A there is secured a seat 70. Also braces 71 may extend between the arms 50 and the frame A if so desired.

In operation the desired number of plows 33 for suitably breaking up the ground are positioned in the plow frame. The frame is then set by means of the hand lever 59 so that the plows will penetrate the desired depth. The scraper 38 is brought to the position shown in Fig. 2 and the rear end is held against upward movement by the lug 57 engaging beneath the sectional truss member 54, as shown in the same figure. The front end of the scraper is moved upwardly or downwardly to secure the depth of cut desired and it is held in its adjusted position by the lever 39. As the device is drawn forwardly the plows will break up the ground, which will be taken up by the scraper. When the scraper is filled the earth is conveyed to the desired place and dumped, which is accomplished in the following manner:—

The hand lever 39 is manipulated for rotating the shaft 16 to raise the frame A upon the rear wheels 21. From the position of the wheels shown in Figs. 1 and 2 the lever 39 should be moved backwardly and the shaft 16 rotated clockwise in order to effect the raising of the frame A. When the frame has been raised as shown in Fig. 3, the hand lever 40 is then manipulated to swing downwardly the forward end of the scraper 38. Forward movement of the hand lever 40 will accomplish this. When the forward end of the scraper 38 is swung downwardly the bars 49 will move forwardly, such being permissible by their elongated slots 52. The members 53 will likewise move forwardly during this operation sufficiently to permit the teeth 57 to disengage from beneath the truss members 54 and permit the members 57 to rise to the position shown in Fig. 3.

The scraper 38 will assume the position likewise shown in Fig. 3 and the contents will be dumped therefrom. Operation of the levers 39 and 40 reversely to what has been heretofore stated will of course return the scraper to its original position as shown in Fig. 2 and lower the rear end of frame A to its horizontal or original position. The springs 58 tend to draw the bars 53 in position for seating the teeth beneath the truss members 54. The forward end of the scraper can be lifted when returning for another load and when the place where the scraping to be done is reached, the same can be lowered and adjusted to take the desired cut by the hand lever 39. Also the plows may be lifted and so held by the hand lever 59. The plows of course should be lifted after the scraper is filled and it is desired to proceed to the place for dumping.

While I have shown and described the preferred combination and arrangement of my invention, it is to be understood that I an aware that various changes could be made by those skilled in the art without departing from the spirit of my invention.

Having thus described my invention, what I claim and desire to secure by Letters Patent, is:

1. In a land leveler, a wheeled frame, a scraper pivotally carried under the frame, a pair of rigid arms depending from the frame in the rear of the scraper, bracing members between said arms and the frame, a rod connecting said arms at the lower ends of the latter, bars having connection with the scraper and provided with slots adapted to slidably embrace said rod adjacent the respective aforesaid depending arms, a bar having pivotal connection with each of the aforesaid bars and adjacent their upper ends provided with shouldered projections, with the shoulders arranged to engage under a member of said frame to hold the scraper normally against upward movement, a lever mounted on the frame, and means connecting the lever and the scraper whereby to elevate the scraper against the holding action of the aforesaid shouldered projections.

2. In a land leveler a wheeled frame, a pivoted scraper carried by the frame, means supported from the frame and arranged in the rear of the scraper and having connection with the latter and including bars having shouldered projections with the shouldered projections arranged to engage a part of the frame to hold the scraper normally against upward movement, a lever on the frame and means connecting the lever and the scraper to elevate the latter against the holding action of the aforesaid projections of said bars.

3. In a land leveler, a frame and supporting wheels therefor, a scraper carried thereby, a hand lever carried by said frame and connected with the forward end of the scraper by links, said hand lever being adapted to raise and lower the forward end of the scraper, and guide means pivotally attached to rear end of the scraper, whereby the forward and rearward movement of the scraper is limited.

4. In a land leveler, a frame and supporting wheels therefor, a scraper carried thereby, a hand lever carried by said frame and connected with the forward end of the scraper by links, said hand lever being adapted to raise and lower the forward end of the scraper, and guide means pivotally attached to rear end of the scraper, whereby the forward and rearward movement of the scraper is limited, and guide means likewise connected with the rear end of the scraper adapted to permit vertical movement thereof, said last named guide means having associated therewith catch means whereby the rear end of the scraper may be positively held against upward movement.

5. In a land leveler a frame and supporting wheels therefor, a scraper carried thereby, means for raising the rear end of the frame to permit the scraper to be dumped, a hand lever carried by said frame and connected to the forward end of the scraper through the means of links, and adapted to raise and lower said forward end of the scraper, guide means connected with the rear end of the scraper and associated with said frame, adapted to limit the forward and rear movement of said scraper, and guide means likewise connected with said rear frame, adapted to permit upward and downward movement of the rear end of said scraper, said last named guide means having associated therewith a spring and catch means whereby the rear end of the scraper will be positively held against upward movement when gathering a load, and said spring and catch means being releasable when the forward end of the scraper is lowered for dumping.

HENRY BARTHULI.